United States Patent [11] 3,609,282

[72] Inventors Hermann Trattner;
Fritz Brosamle; Friedrich Wustner, all of Munich, Germany
[21] Appl. No. 805,296
[22] Filed Mar. 7, 1969
[45] Patented Sept. 28, 1971
[73] Assignee Siemens Aktiengesellschaft
Berlin and Munich, Germany
[32] Priority Mar. 15, 1968
[33] Switzerland
[31] 3874/68

[54] MICROWELDING TORCH
10 Claims, 3 Drawing Figs.

[52] U.S. Cl. ................................................ 219/75, 219/139
[51] Int. Cl. ................................................ B23k 9/28
[50] Field of Search ................................................ 219/87, 144, 69, 75, 130, 139, 136, 119

[56] References Cited
UNITED STATES PATENTS

| | | | |
|---|---|---|---|
| 2,909,641 | 10/1959 | Kucyn | 219/61 |
| 3,129,319 | 4/1964 | Hawk | 219/75 |
| 3,515,847 | 6/1970 | Flowers | 219/138 |
| 1,721,296 | 7/1929 | Fehr | 219/144 |
| 2,979,599 | 4/1961 | Width | 219/87 |
| 3,387,111 | 6/1968 | Driscoll | 219/75 |

Primary Examiner—J. V. Truhe
Assistant Examiner—J. Gregory Smith
Attorney—Hill, Sherman, Meroni, Gross & Simpson ABSTRACT: A electrode clamp that is received by and readily detachable from a machine held microwelding torch insulating body member comprises a broad, easily adjustable clamp means holding a plurality of nonmelting electrodes whereby a plurality of connection points on articles being manufactured can be welded by consecutively opening and closing the welding circuits of the electrodes and the points of connection.

PATENTED SEP 28 1971 3,609,282

INVENTORS
Hermann Trattner
Fritz Brosamle
Friedrich Wünster

BY  ATTYS.

MICROWELDING TORCH

BACKGROUND OF THE INVENTION

1. Field of the Invention

This invention generally relates to a welding torch with nonmelting electrodes for the mechanized shielded arc welding of several points of connection located close to each other in side-by-side relation on an article being manufactured in which points of connection are to be welded at low performance on blanks which may be of a thin panel gauge.

2. Prior Art

Known shielded arc welding equipment is unsatisfactory for making closely spaced points of connection in small electrical components particularly when these components are being manufactured on a mechanized assembly line. Thus, for example, to produce a connection THE a set of contact springs of a small relay and the pins of the corresponding base, the arrangement on the relay of the sets of contact springs and spring pins in a plurality of rows makes welding with the usual protective arc welding torches impossible. Because of this fact the usual method of connection in situations such as this consists of soldering. This method, however, leaves soldering remnants at the joints to be connected, which, when included in the relay housing lead to deposits at the relay contacts that tend to increase the contact transfer resistance.

SUMMARY OF THE INVENTION

It is therefore an object of our invention to create a torch for welding connections in highly complex electrical microconstruction elements in a simple and convenient manner. A shielded arc welding torch of our invention comprises a burner body means, an electrode tension clamp means detachably connected to the burner body and a protective gas nozzle and connections and conduits for welding current and protective gas. A broad clamping element capable of securing a plurality of nonmelting electrodes in generally parallel spaced relation is secured to the forward end of a body support portion and holds the electrodes in position so that they may simultaneously be located at a plurality of connection points on an article being manufactured. With the electrodes in this position a potential and counterpotential may be applied to effect the connections either simultaneously in certain conditions or individually consecutively. In this manner the disadvantages of the prior art are overcome.

We have found that making the body shell of a tubular construction and of insulating material allows simple and convenient construction of the welding torch. Thus, the body means is completed by a central body portion, a spacer member and an end cap which holds the body portion and spacer member against a retainer member fixed to the body shell. These elements may be separate or of one piece and in either construction are easily removed by unscrewing the end cap for example.

Of particular importance in our invention is the simplicity and detachability of our clamp means. In one embodiment it may be a "bayonet"-type attachment means whereby the clamp means is held in biased relation against the retainer member. The advantage to this detachability is that the electrodes may be maintained and adjusted by simply replacing the clamp means which includes the electrodes. A simple push and twist removes and replaces the clamp means keeping machine "down time" at a minimum. Moreover clamp element compression may be adjusted with the clamp means either on or off of the burner body. Also the clamp element itself may be readily replaced.

An electrode guide keeps the electrodes in alignment and allows ease of adjustment while keeping the electrodes in the proper welding position. Protective gas is fed in through a passageway running the length of the support portion so that the protective gas surrounds the electrodes interior of the nozzle outlet as well as exterior of the nozzle outlet in the area of the weld. A detachable filter prevents foreign bodies from entering into the weld area and assures dispersal of the gas about the connection.

Other advantages and features of this invention will more fully become apparent in view of the following detailed description taken in conjunction with the accompanying drawings illustrating therein a single embodiment and in which:

DESCRIPTION OF THE PREFERRED EMBODIMENT

Figure 1:
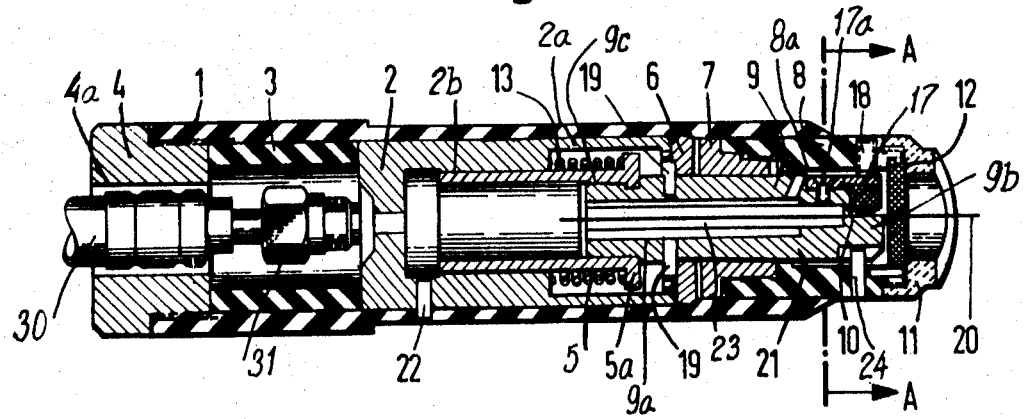
FIG. 1 shows a longitudinal elevational section through an embodiment of the torch.

There is shown in FIG. 1 a welding torch body means comprising a tubular insulating body shell 1 receiving therein an electrically conductive interior central body portion 2, an insulating body spacer portion 3 and a body connector member 4 threadedly engaging the body shell 1 to hold the body portions 2 and 3 in fixed relation to the body shell 1.

An opening 4a in the end cap 4 provides an entrance for the protective gas conduit 30. A suitable connection 31 is shielded by the body spacer portion 3.

The central body portion 2 has a first recess 2a therein and a second recess 2b of lesser diameter than said first recess therein. A contact bushing 5 has a first and second end, said first end being received in said second recess and said second end having a peripheral flange 5a thereabout. A biasing means which may be a coil spring 13 of greater diameter than said contact bushing and said second recess, is positioned between the bottom of said first recess 2a and said contact bushing peripheral flange to bias said contact bushing toward a retainer member 6 and to allow the contact bushing 5 to be forced into the second recess a short distance so that connection of the clamp means may be effected. The retainer member 6 is securely positioned within the burner body shell 1 in any suitable manner to resist the biasing force of the contact bushing 5.

The removable and replaceable clamping means which is received in part within the body shell 1 and held in spring bias relation by the contact bushing 5 against the retainer member 6 comprises a central tension clamp support member portion 9 which has a guide and gas-receiving passageway 9a therethrough. On what may be termed the outer or forward end of the support member 9 there is an anterior clamping portion 9b which serves as a surface against which the electrodes may be clamped. At the inner or rearward end of the clamp support member an end portion 9c of reduced size is received within the contact bushing 5 to make a stable connection therewith. A lip caused by the reduction in size of the end 9c bears against the peripheral flange 5a on the second end of said contact bushing 5.

A clamp element 10 is mounted on the forward portion of the clamp support member 9 b and may be of a broad width to cooperate with an equally broad anterior portion 9b to clamp a plurality of electrodes 20 against movement. The clamp element 10 may be mounted on a bracket member 17 which in turn is detachably connected to the clamp support member 9 by means of a standard connection 17 a such as a flathead screw.

In addition to the clamp support member 9 and the clamp element assembly 10, 17, 17a the clamp means of this invention comprises a centering bushing 7 surrounding the support portion 9 and conforming to the interior dimensions of the body shell 1 to assist in the positioning of the support portion 9 in said body shell. The clamp means also includes a nozzle bushing 8 connected with said centering bushing and also surrounding in part the support portion 9 and the clamp element assembly 10. As shown said nozzle bushing 8 conforms in its outer dimensions to the interior of said body shell 1. A nozzle member 11 may be attached to the nozzle bushing 8 by any convenient means such as the threaded manner shown. This manner of attachment of the nozzle 11 also serves to clamp a filter 12 over the nozzle opening. The filter may be appropriately constructed to allow passage of the electrodes therethrough. A clamp pressure adjustment means 18 extends through said nozzle bushing 8 into engagement with the clamp element bracket 17 to allow easy adjustment of pressure between the clamp element 10 and the anterior clamping portion 9b. In one form this pressure adjustment means 18 may be a threaded setscrew.

A locking means 19 extending from the support portion 9 cooperates with the retainer member 6 under the biasing force of the contact bushing 5 to provide a detachable connection for said clamp means. While it is shown that the locking means 19 comprise a pair of protrusions or pins which extend behind the retainer member 6 it is to be understood that the retainer member 6 includes a widened portion (not shown) of greater diameter through which the locking means 19 may pass and a portion of lesser diameter behind which the locking means may be rotated to provide the secure connection. It is also to be understood that the inner portion of the retaining member against which the locking means will bear may have a roughened surface or locking pin receiving grooves therein to prevent rotative movement of the pins and the clamp means. While this readily detachable means has been shown to be of a "bayonet" type it is within the contemplation of this invention that any equivalent means performing the same function in the same manner may be used.

The plurality of nonmelting electrodes 20 may be received in an electrode carrier 23 which serves to hold them in a straight spaced-apart relation adapted to the particular device being manufactured. Although the various dimensions of the welding torch will be within the purview of those skilled in the art it may be seen that the depth of the second recess 2b in the body member and the length of the clamping means will be such to accommodate electrodes of various lengths and staggered relations.

Figure 2:
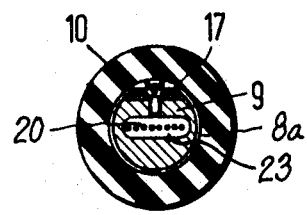
FIG. 2 is a cross section taken along the line A—A showing the arrangement of the electrodes.

A gas passageway extends from the gas conduit 30 and gas conduit connection 31 through the second recess, the contact bushing 5 and the clamp means to provide at the nozzle an adequate supply of protective gas necessary for efficient operation of the welding torch. As shown, this passageway proceeds from the second recess through the interior of the contact bushing 5 along the passageway through the support member 9 at least a portion of that distance and then proceeds through openings 21 to an outer passage area 8a in the nozzle bushing 8 surrounding the outer end of the support member 9 and the clamp element assembly 10 from which it is dispersed through the filter 12 to shield the arc between the electrode 20 and the members to be joined. The gas passageway 8a may be best seen in FIG. 2.

From the above description of the invention it may be seen that the contact bushing 5, the biasing means 13 and the retaining member 6 which is securely fastened to the burner body shell 1 so coact with the locking means 19 and the clamp support portion 9 that a "bayonet" lock is created making possible the rapid replacement of the electrode-clamping means.

In operation the exchangeable clamp means which comprises the centering bushing 7, the nozzle bushing 8, the support portion 9 and the clamp element assembly 10 is attached to the body by inserting it into the body shell 1 with the locking means 19 in a position so that the pins or protrusions pass through the cooperating openings of greater diameter in the retainer member 6 whereby the end portion 9c of reduced size is received within the retainer bushing 5 and bears thereagainst to compress the biasing means 13. While in this position the clamp means is rotated so that the locking means 19 are engaged by the biasing means 13 against the retainer member 6. The retention of the locking means may be increased by providing a roughened surface or grooves on the retainer member so that the locking pins may seat themselves in the grooves provided on the rear side of the retainer member 6 and cooperate with the biasing means 13 to prevent accidental rotation or removal of the clamp means.

The supply of electrical power to the electrodes 20 can be directly applied at the electrode end, as for example, through an opening 24 or it may be supplied through the perforation 22 to the body portion 2. The conductive connection to the electrodes 20 is assured by an efficient electrical connection between the central body portion 2, the contact bushing 5 and the electrode clamp support member 9.

Figure 3:
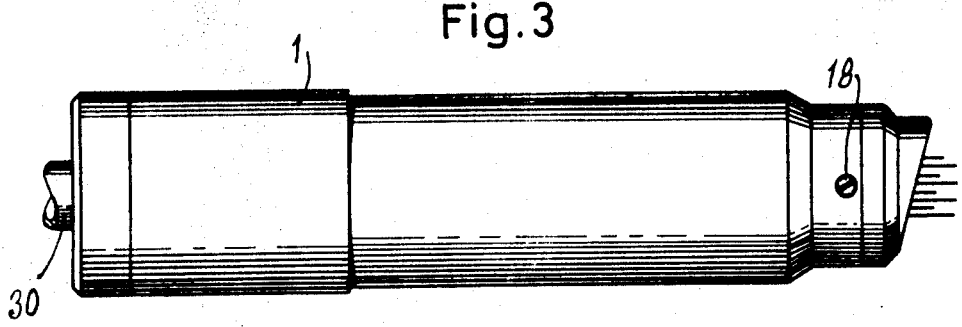
FIG. 3 shows a plan view of the torch.

The plan view of the torch according to FIG. 1 shows an electrode arrangement which may be used to effect connections between various elements of electrical devices such as for example, base pins and the spring set of a comb relay. In the case of a comb relay having for example two rows each having four base pins, the welding is accomplished by having the relative lengths of the electrode adjusted as may be seen in FIG. 3 and placing the torch into welding position with the electrodes at one potential and the base pins at a counterpotential and then consecutively switching the welding circuits by means of a step switch whereby the welding arcs are consecutively created to consecutively form the welded constructions in the comb relay.

The outer surface of the burner body shell 1 is machined so that the torch can be inserted exactly into a machine guide on a mechanized welding apparatus. Various collars or stops in this outer surface may be provided to facilitate the adjustment of a distance between the electrode and the blank.

We have found that when using conventional thoriated tungsten electrodes a problem is created in that after a number of ignitions the ignition capacity of the electrodes drops. This we have found may lead to the danger that certain individual welding operations are not carried out and thus the efficiency of a completely mechanized or automated manufacturing welding connection operation is impeded. This problem may be remedied by using electrodes manufactured according to the Swiss Pat. application No. 2,678/68 which provides for coating of thorium oxide having a high ignition dependability over a large number of ignitions.

Although minor modifications might be suggested by those versed in the art, it should be understood that we wish to embody within the scope of the patent warranted hereon, all such modifications as reasonably and properly come within the scope of our contribution to the art.

We claim as our invention:

1. A multi electrode arc welding torch having a plurality of nonmelting electrodes connected to a body means by a clamp means, the improvement in said clamp means comprising a clamp element and a clamp support member, said plurality of nonmelting electrodes being received between and being securely clamped by said clamp element and said clamp support member, and a clamp pressure means operable to exert the clamping pressure between said clamp element and said clamp support member to secure said electrodes therebetween.

2. A microwelding torch according to claim 1 wherein said clamp pressure means is operable to release the clamping pressure on said plurality of electrodes to allow replacement thereof.

3. A microwelding torch according to claim 1 includes means wherein each of said electrodes may be clamped in a predetermined position to simultaneously contact a plurality of electrically insulated connection points, and said electrodes being insulated from each other whereby the welded connections may be individually effected by applying an electric current to the electrodes at each of the points of connection.

4. A microwelding torch according to claim 1 wherein said support member has an interior clamping portion on its outer end and a portion of reduced size at its inner end, a centering bushing and nozzle bushing surrounding the support member and conforming to the interior dimensions of the body means to hold said support member in position.

5. A microwelding torch according to claim 1 wherein said clamp pressure means is in engagement with said body means and extends thereto into engagement with said clamp element.

6 A microwelding torch according to claim 1 wherein said body means includes a retaining member fixedly secured thereto, said retaining member having an opening therein, said opening having a portion of greater diameter and a portion of lesser diameter, said clamp means having a locking means protrusion thereon, said clamp means with said locking means thereon passing through said opening of greater diameter but being restrained by said opening of said lesser diameter whereby when said locking means is rotated from the portion of greater diameter to the portion of lesser diameter the direct withdrawal of the clamp means is prevented.

7. A microwelding torch according to claim 6 wherein said body means includes a biasing means cooperating with a contact bushing to urge said clamp means and said locking means thereon, against said retaining member and thereby secure said locking means against rotation.

8. A microwelding torch according to claim 7 wherein said body means includes a central body portion having first and second recesses therein, said contact bushing having a first and second end, said first end being received in said second recess and said second end having a peripheral flange thereabout, a coil spring biasing means between said first recess and said flange biasing said locking means against said retainer member.

9. A microwelding torch according to claim 1 having means connected therewith for supplying welding current to said electrodes and protective gas in the area of the electrode welding ends.

10. A welding torch according to claim 1 wherein a passageway extends through the length of said clamp means, said passageway receiving an electrode guide means therein, said electrode guide means being smaller than said passageway over at least a portion of the length of said passageway whereby said passageway may also transmit protective gas therethrough to the area of said electrode end.

UNITED STATES PATENT OFFICE
CERTIFICATE OF CORRECTION

Patent No. 3,609,282          Dated September 28, 1971

Inventor(s) Hermann Trattner et al

It is certified that error appears in the above-identified patent and that said Letters Patent are hereby corrected as shown below:

Column 4, line 38, please correct "2,678/68" to --2,687/68--.

Signed and sealed this 6th day of June 1972.

(SEAL)
Attest:

EDWARD M. FLETCHER, JR.          ROBERT GOTTSCHALK
Attesting Officer                Commissioner of Patents